United States Patent
Kubota et al.

(10) Patent No.: US 7,925,919 B2
(45) Date of Patent: Apr. 12, 2011

(54) DISK MANAGEMENT METHOD, DISK MANAGEMENT DEVICE AND STORAGE SYSTEM

(75) Inventors: Norihide Kubota, Kawasaki (JP); Hideo Takahashi, Kawasaki (JP); Yoshihito Konta, Kawasaki (JP); Atsushi Igashira, Kawasaki (JP); Mikio Ito, Kawasaki (JP); Hidejirou Daikokuya, Kawasaki (JP); Kazuhiko Ikeuchi, Kawasaki (JP); Chikashi Maeda, Kawasaki (JP); Yuji Noda, Kahoku (JP); Tsuyoshi Nakagami, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 12/234,940

(22) Filed: Sep. 22, 2008

(65) Prior Publication Data
US 2009/0113236 A1  Apr. 30, 2009

(30) Foreign Application Priority Data
Oct. 30, 2007 (JP) .................. 2007-282339

(51) Int. Cl.
G06F 11/00 (2006.01)
(52) U.S. Cl. .................. 714/6; 714/8; 714/723; 714/11
(58) Field of Classification Search .......... None
See application file for complete search history.

(56) References Cited

U.S. PATENT DOCUMENTS

| 5,774,643 | A  | * | 6/1998 | Lubbers et al. ................. 714/20 |
| 7,529,967 | B2 | * | 5/2009 | Findleton et al. ................. 714/6 |
| 7,730,346 | B2 | * | 6/2010 | Kroesche et al. ................. 714/6 |
| 2006/0015769 | A1 | | 1/2006 | Ikeuchi et al. |
| 2006/0179217 | A1 | * | 8/2006 | Ito et al. ........................ 711/112 |
| 2006/0218343 | A1 | | 9/2006 | Higashijima et al. |
| 2010/0037091 | A1 | * | 2/2010 | Baderdinni et al. .............. 714/6 |

FOREIGN PATENT DOCUMENTS
JP 2006-031332  2/2006
JP 2006-268673  10/2006
* cited by examiner

*Primary Examiner* — Christopher S McCarthy
(74) *Attorney, Agent, or Firm* — Staas & Halsey LLP

(57) ABSTRACT

A disk management method for managing a disk management device for writing and reading data to and from a disk drive in which a recording medium is managed in a first control unit. The disk management method includes an error checking operation for checking an error on the recording medium in the first control unit, an error correction operation for correcting the error detected in the error, an error correcting operation for correcting the error detected in the error checking operation after converting data including the error to the second control unit, a data loss registration operation for registering a region in which data are lost due to an inconsistency between the first control unit and second control unit in a data loss region table, and a data loss recovery operation for recovering the loss of data with reference to the data loss region table.

20 Claims, 7 Drawing Sheets

RECOVERY PROCESS

RECOVERY PROCESS

DETECT ERROR

RECOVER DATA FROM DETECTED ERROR

RECOVER DATA LOSS

COMPLETE RECOVERY

DISK MANAGEMENT METHOD, DISK MANAGEMENT DEVICE AND STORAGE SYSTEM

CROSS-REFERENCE TO RELATED APPLICATIONS

This application is related to and claims priority to Japanese patent application no. 2007-282339 filed on Oct. 30, 2007 in the Japan Patent Office, the entire contents of which are incorporated by reference herein.

BACKGROUND OF THE INVENTION

1. Field

An aspect of the present invention relates to a disk management device, a storage system and a disk management method that manage data writing to and data reading from a disk drive. An aspect of the present invention may include a disk management device, a storage system and a disk management method in which a disk drive and a disk management device manage data in different control units.

2. Description of the Related Art

Recently, the capacity of recording media has been increased by a technique in which accesses to multiple disk drives are managed collectively by a disk management device. Typically, the storage systems have an error-correcting function to achieve greater levels of reliability.

Japanese Laid-open Patent Publication 2006-268673 discloses a technique in which all sectors subsequent to an incomplete-write sector are checked for errors when writing a series of data onto multiple sectors has failed and been suspended is known.

Japanese Laid-open Patent Publication 2006-31332 discloses a technique in which disk drives have a redundant configuration is also known. Losses of data in a disk drive are checked and recovered in a check process to restore the redundancy.

Conventional storage systems use a Fiber Channel (FC) disk or a Serial Attached SCSI (SAS) disk. The FC disk and the SAS disk are partitioned by 520-byte block-512 bytes for data and 8 bytes for block check character. Data stored on the disks are managed by logical block addresses (LBA) assigned to each block. Thus, the disk management device controls accesses to the disk with LBAs assigned to each 520-byte block as well.

There has been a demand of realizing a technique in which the disk management device managing data with the 520-byte control unit manages disks on which data are managed with LBAs assigned to 512-byte blocks, such as a SATA disk. Managing disks on which data are managed in different control units may reduce costs on an entire system by utilizing inexpensive disks in parallel with utilizing conventional management device configuration.

However, where data stored on the disks and in the disk management device are managed in different control units, LBAs assigned to the disks may be inconsistent with LBAs assigned to the disk management device. Data are recovered based on the LBA when an error occurs. However the inconsistency may contribute to loss of data in an error correction process.

SUMMARY

In accordance with an aspect of an embodiment, a disk management method manages a disk management device for writing and reading data to and from a disk drive, in which a recording medium is managed in a first control unit, the disk management method includes an error checking operation for checking an error on the recording medium in the first control unit, an error correction operation for correcting the error detected in the error, an error correcting operation for correcting the error detected in the error checking operation after converting data including the error to the second control unit, a data loss registration operation for registering a region in which data are lost due to an inconsistency between the first control unit and second control unit in a data loss region table, and a data loss recovery operation for recovering the loss of data with reference to the data loss region table.

The above-described embodiments of the present invention are intended as examples, and all embodiments of the present invention are not limited to including the features described above.

DETAILED DESCRIPTION OF THE PREFERRED EMBODIMENTS

Figure 1:
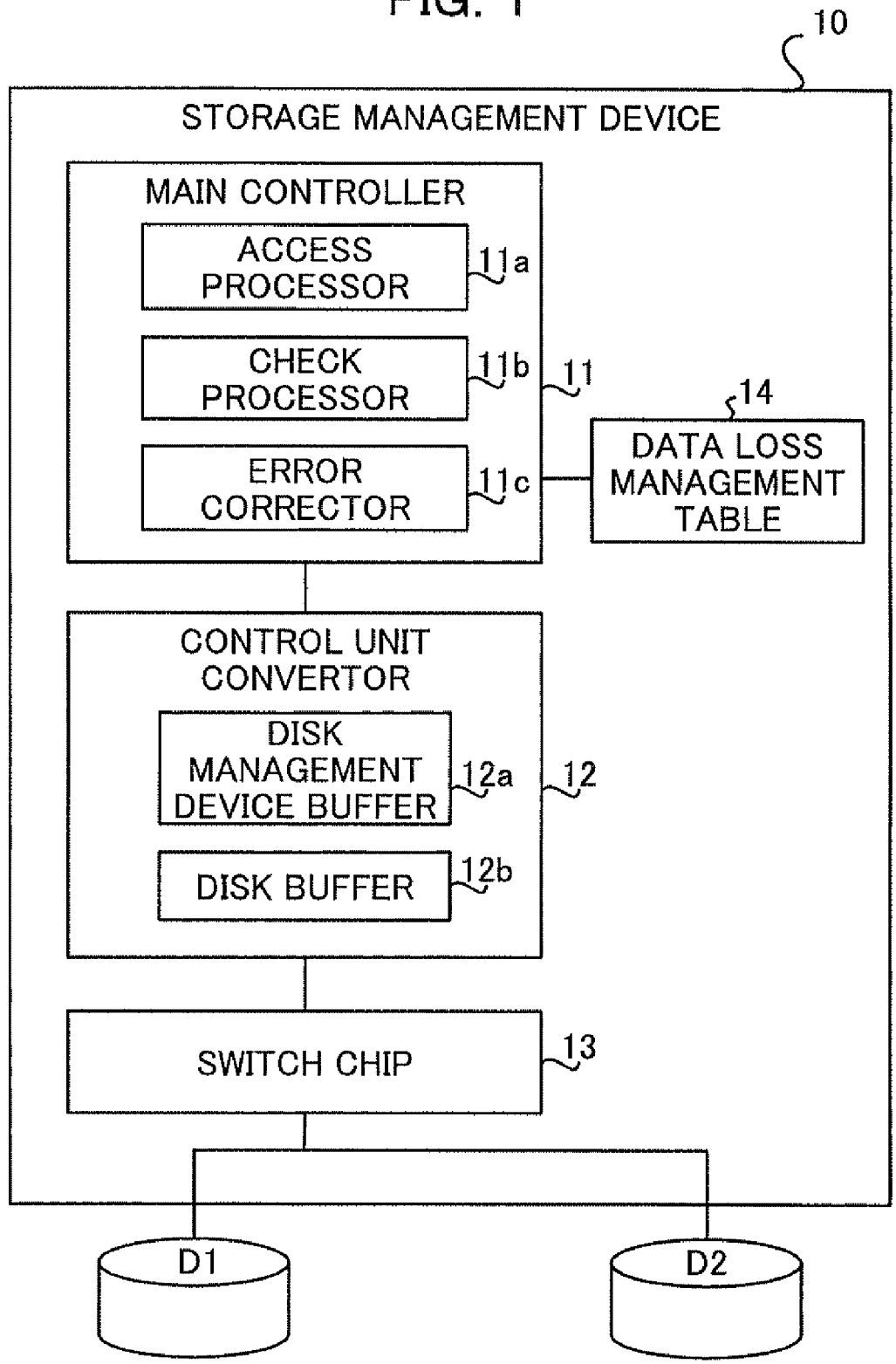
FIG. 1 illustrates a schematic view of the storage management device.

Reference may now be made in detail to embodiments of the present invention, examples of which are illustrated in the accompanying drawings, wherein like reference numerals refer to like elements throughout.

The disk management method, the disk management device and the storage system according to an embodiment of the present invention will be disclosed.

FIG. 1 illustrates the schematic view of storage management device 10. Storage management device 10 connects to disk drives D1 and D2. Storage management device 10 includes a main controller 11, a control unit converter 12, a switch chip 13 and a data loss management table 14 as shown in FIG. 1.

Main controller 11 controls storage management device 10 completely. Main controller 11 has an access processor 11a, a check processor 11b and an error corrector 11c. Access processor 11a handles accesses such as write requests and read requests from an external terminal (not shown in FIG. 1) to the disks.

Check processor 11b cyclically checks the disks mounted in the disk drives connected to storage management device 10 for errors. Error corrector 11c corrects errors of the disks detected in accessing or checking the disks. Each disk mounted in disk drive D1 stores mirror contents of disks mounted in disk drive D2. Storing mirror contents of disks provides a redundant configuration. If an error occurs on either side of the mirror, data are reconstructed from the data stored on the other side of the mirror.

Switch chip 13 switches an access destination of storage management device 10. Control unit converter 12 converts control units. Switch chip 13 switches a disk to be accessed from storage management device 10.

Disk drives D1 and D2 mount SATA disks. Disc drive D1 and disk drive D2 are a mirrored pair, included in the redundant array. The disk drives manage data writing and reading to or from the recording media mounted therein with LBAs assigned to every 512-byte-block (hereinafter referred to as LBA512).

Storage management device 10, on the other hand, manages accesses to the disk with LBAs assigned to every 520-byte-block (hereinafter referred to as LBA520). The difference between the control units will be solved by converting the addresses by control unit converter 12.

Control unit converter 12 includes disk management device buffer 12a and disk buffer 12b. Control unit converter 12 handles accesses after converting the addresses using these buffers.

Figure 2:
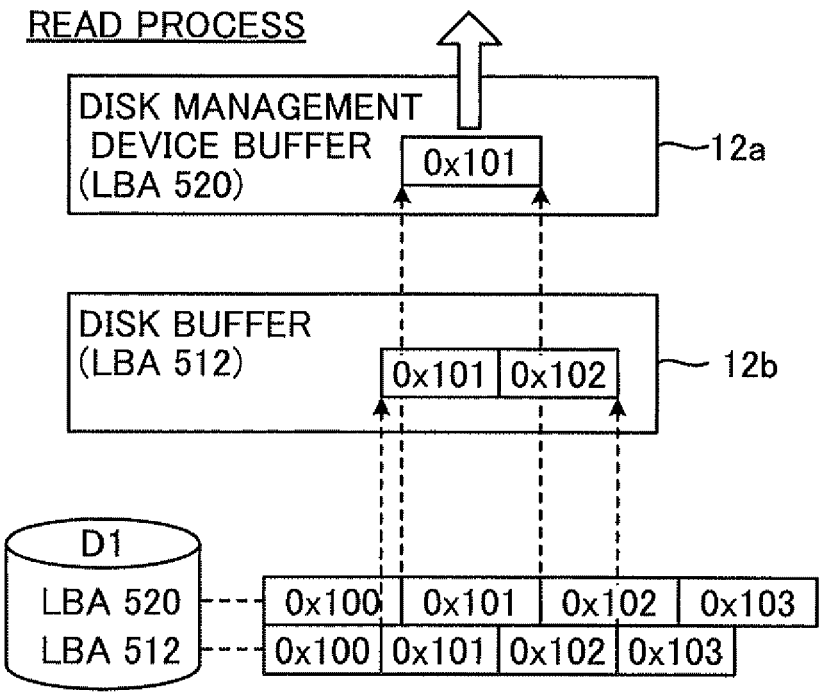
FIG. 2 illustrates a read process executed by the storage management device.

FIG. 2 illustrates the read process executed by storage management device 10. A region of the recording medium to which LBA520 0x101 was assigned corresponds to regions to which LBA512s 0x101 and 0x102 were assigned as shown in FIG. 2.

The data from the regions to which LBA512s 0x101 and 0x102 were assigned are read first, in order to read data stored in the region to which LBA520 0x101 was assigned. The data are then buffered in disk buffer 12b. Secondly, a portion matching the data stored in the region to which LBA520 0x101 is assigned is extracted from the data buffered in disk buffer 12b. The extracted data are buffered in disk management device buffer 12a. Thus, the read request with the LBA520 to disk drive D1 is executed in which data are managed with LBA512s.

Figure 3:
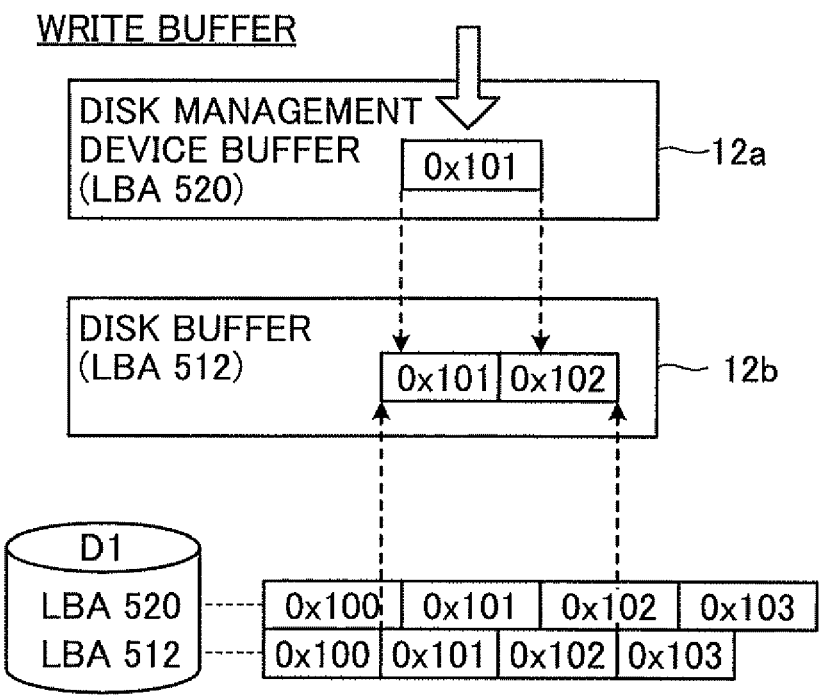
FIG. 3 illustrates a write process executed by the storage management device.

FIG. 3 illustrates the write process executed by storage management device 10. To write data in the region to which LBA520 0x101 was assigned, firstly, the data are buffered in disk management device buffer 12a as shown in FIG. 3. At the same time, the data stored in the regions to which LBA512s 0x101 and 0x102 were assigned, and in which data stored in the region to which LBA520 0x101 was assigned are included, are read out and then buffered in disk buffer 12b.

Secondly, the data buffered in disk management device buffer 12a are merged into the corresponding portion of the data buffered in disk buffer 12b. Thereafter, the data are written back to disk drive D1. Thus, the write request with LBA520 to disk drive D1 is executed in which data are managed with LBA512s.

Figure 4:
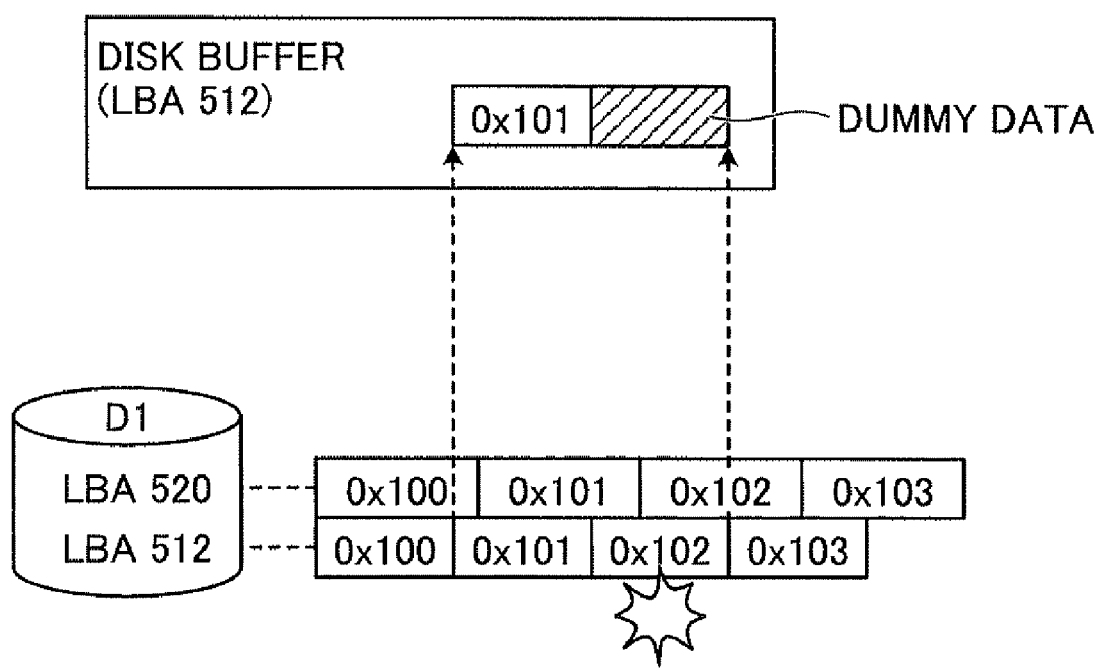
FIG. 4 illustrates a recovery process executed by the storage management device (part 1)

The recovery process to recover data stored in disk drive D1 from errors will be discussed with reference to FIGS. 4 and 5. Consider an error occurring in the region of the recording medium mounted in disk drive D1 to which LBA512 0x102 was assigned. The region to which LBA512 0x102 was assigned corresponds to the regions to which LBA520s 0x101 and 0x102 were assigned. Error corrector 11c recognizes that the error occurs in the region to which the lower number was assigned, in this case, LBA520 0x101.

Error corrector 11c recovers the data stored in the region of the recording medium mounted in disk drive D1 to which LBA520 0x101 was assigned by using corresponding data stored in disk drive D2. Firstly, error corrector 11c reads out the data stored in the region of the recording medium mounted in disk drive D1 to which LBA520 0x101 was assigned as shown in FIG. 4. Since the region to which LBA520 0x101 was assigned corresponds to the regions to which LBA512s 0x101 and 0x102 were assigned, the data stored in the regions to which LBA512s 0x101 and 0x102 were assigned are read out from the disk buffer. If the error corrector 11c fails to read the data stored in the region assigned address 0x102 because of the error, the damaged data are replaced with dummy data consisting of 0s.

Figure 5:
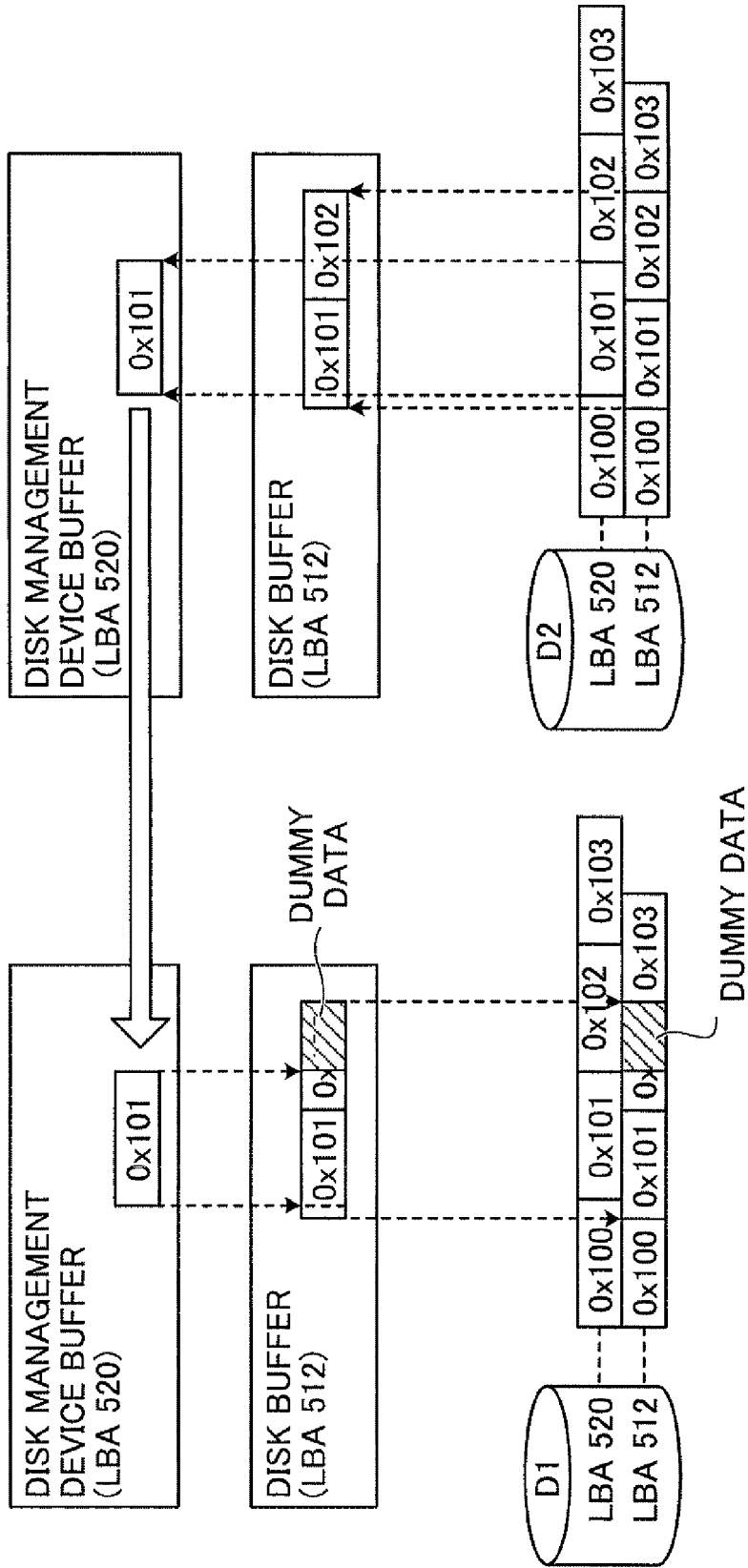
FIG. 5 illustrates the recovery process executed by the storage management device (part 2)
Figure 6A:
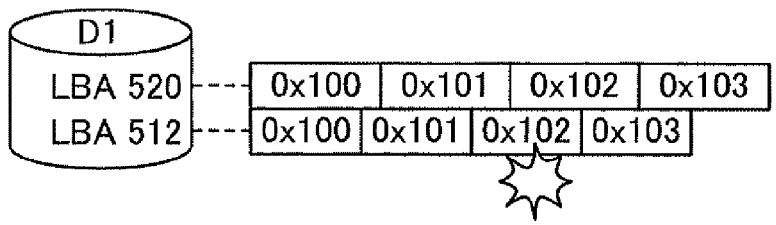
FIG. 6 illustrates a data loss recovery process executed by the storage management device.
Figure 6B:
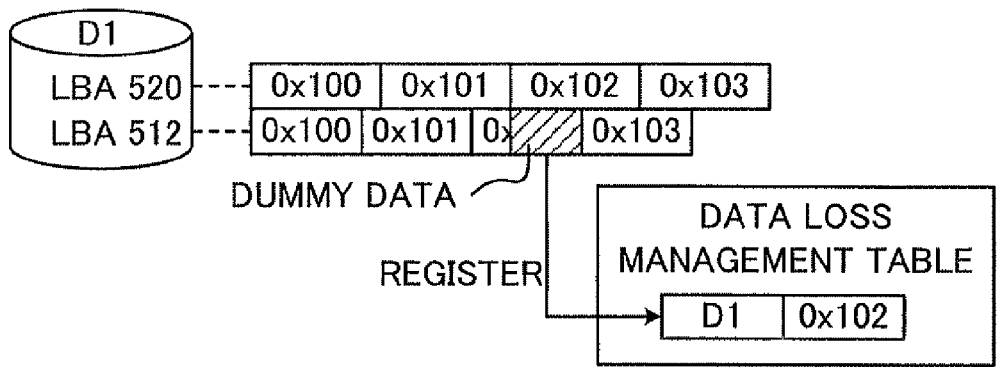
Figure 6C:
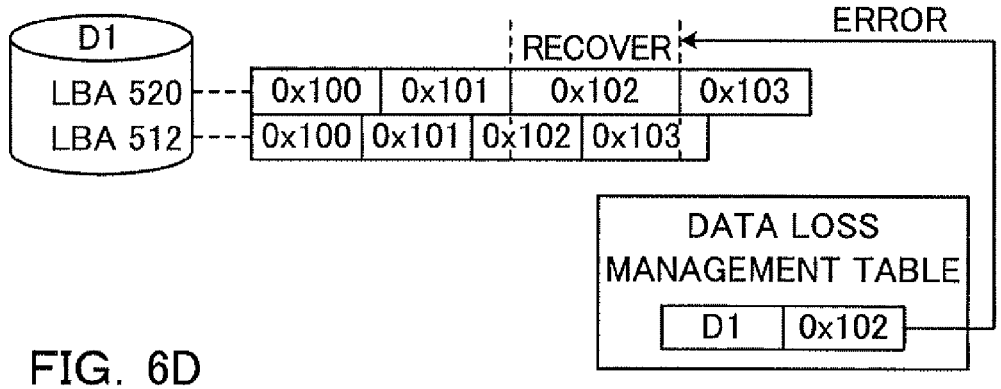
Figure 6D:
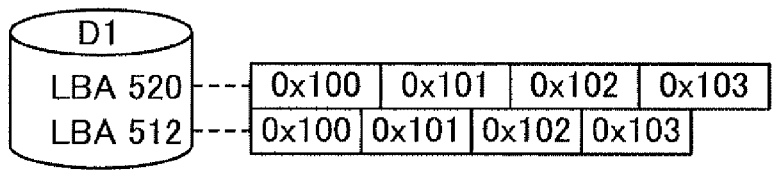

Secondly, data stored in the corresponding region of the recording medium mounted in disk drive D2 are read out as shown in FIG. 5. The same data of the data stored in the region of the recording medium mounted in disk drive D1 to which LBA520 0x101 was assigned are stored in the region of the recording medium mounted in disk drive D2 to which LBA520 0x101 was assigned as shown in FIG. 5. Likewise, in the read process, the data stored in the region of the recording medium mounted in disk drive D2 to which LBA520 0x101 was assigned are read out. Since the data read out from disk drive D2 are duplicated from the data stored in the region of the recording medium mounted in disk drive D1 to which LBA520 0x101 was assigned, the data are identical to the intact original.

Thirdly, the data read out from the region of the recording medium mounted in disk drive D2 to which LBA520 0x101 was assigned are merged into the data stored in the disk buffer in a manner similar to that of the write process described above. The data are then written back to disk drive D1.

Thus, the data stored in the region of the recording medium mounted in disk drive D1 to which LBA520 0x101 was assigned are restored to the original state. Although a part of the data stored in the region to which LBA512 0x102 was assigned are restored, that which corresponds to the data stored in the region to which LBA520 0x101 was assigned are not restored. The data which is not restored corresponds to the data stored in the region to which LBA520 0x102 was assigned, which was replaced with the dummy data. In short, a part of data stored in the region assigned LBA512 0x102 of the recording medium mounted in disk drive D1 is lost.

Error corrector 11c registers the region in which the data were lost in the recovery process in the data loss management table 14 shown in FIG. 1. In this case, the data in the region assigned address 0x102 were lost. The data loss region registered in data loss management table 14 is recovered when the disk is accessed with the address of the region or checked by check processor 11b by simulating a psuedo error occurrence to execute the recovery process.

Recovering lost data will be disclosed with reference to FIG. 6. Firstly, when an error is detected in the region of the recording medium mounted in disk drive D1 to which LBA512 0x102 was assigned, the data including the error are recovered in the recovery process described above. During the process, an address of the region in which the data are lost due to the difference between the first control unit and the second control unit is registered in data loss management table 14.

Secondly, the data loss management table 14 is referenced the next time disk drive D1 is checked or accessed, and the error occurring in the region registered in the data loss management table is reported. Error corrector 11c executes the recovery process described above to recover the data in response to the pseudo error by compensating for the loss from duplicated data stored in disk drive D2.

The recovery process in response to the pseudo error is similar to the process in the event of an actual error. However, the error is pseudo, so the data are read out from disk drive D1 successfully. Thus, the data is not substituted with dummy data, preventing another loss of data.

Figure 7:
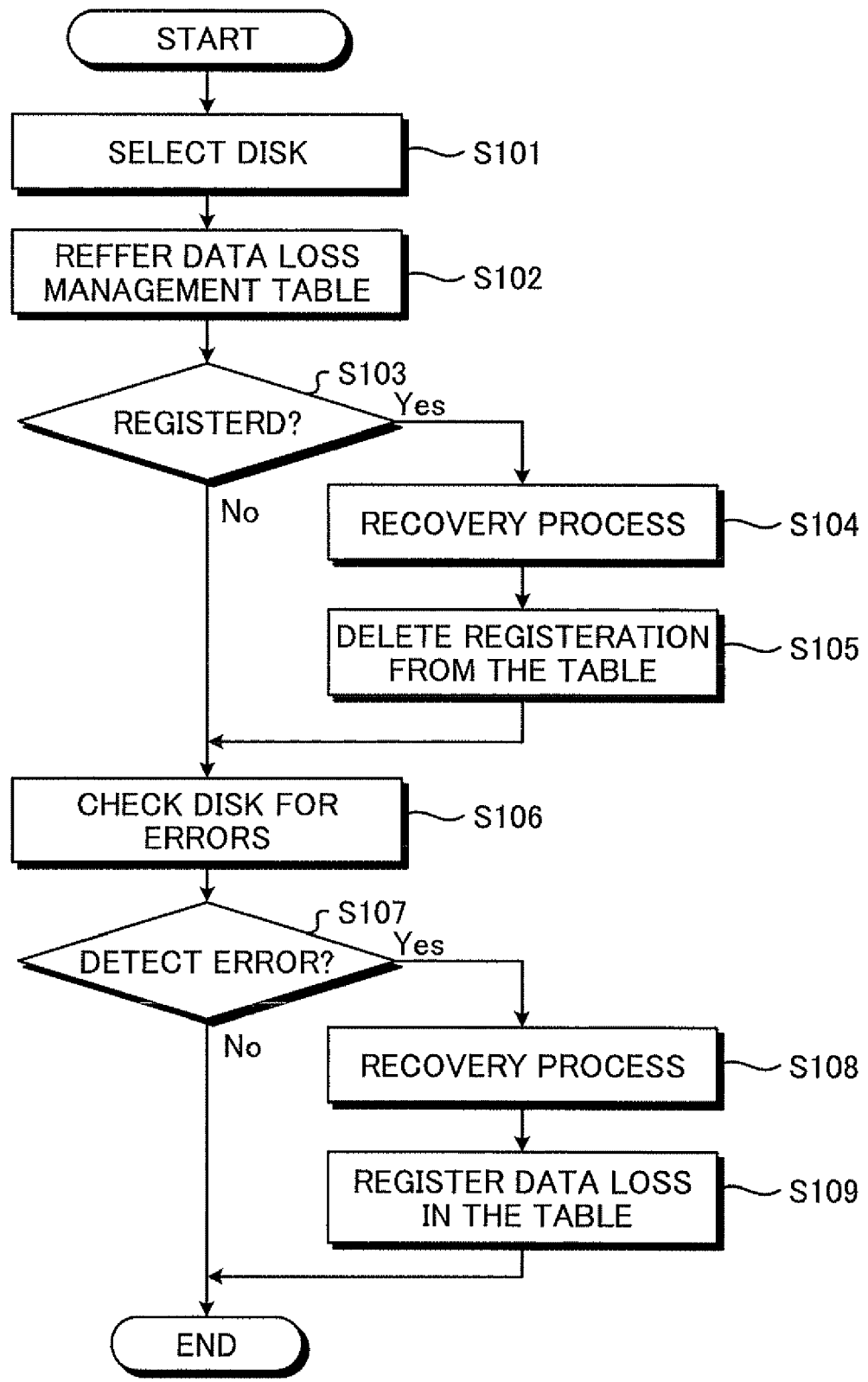
FIG. 7 is a flow chart illustrating a check process executed by the storage management device.

The check process executed by storage management device 10 will be disclosed with reference to FIG. 7. Firstly, check processor 11b selects a disk to be checked for errors (operation S101). Secondly, data loss management table 14 is referenced (operation S102). Thirdly, error corrector 11c recovers the error included in the region at the address registered in data loss management table (operation S104) when the selected disk includes the region registered in the table (operation S103, Yes). Thereafter, the registration of the address is deleted from data loss management table 14 (operation S105).

Where no data losses of the selected disk are registered (operation S103, No), or after recovering the data loss, then check processor 11b checks the selected disk for errors (operation S106).

Where an error is detected (operation S107, Yes), error corrector 11c recovers a region in which the error is detected (operation S108). Then an address of the region in which the data are lost during the recovery is registered in data loss management table 14 (operation S109). Then the process is completed.

As described above, the address of the region in which a part of the data is lost due to the inconsistency between the control units is registered in data loss management table 14. The loss is recovered in the next checking by simulating the pseudo error occurrence in the region at the address registered. Accordingly, the conventional storage device 10 may be used without any changes.

Data loss management table 14 may be referenced before anything else not only in checking but also in issuing a read request to a disk. It is desirable to report a pseudo error to recover the loss when an address of a data loss region that corresponds to the read request is registered.

Where a write request is issued to a disk and an address corresponds to the write request is registered in data loss management table 14, the loss is compensated for by the writing. Therefore, the registration will be deleted from data loss management table 14.

Figure 8:
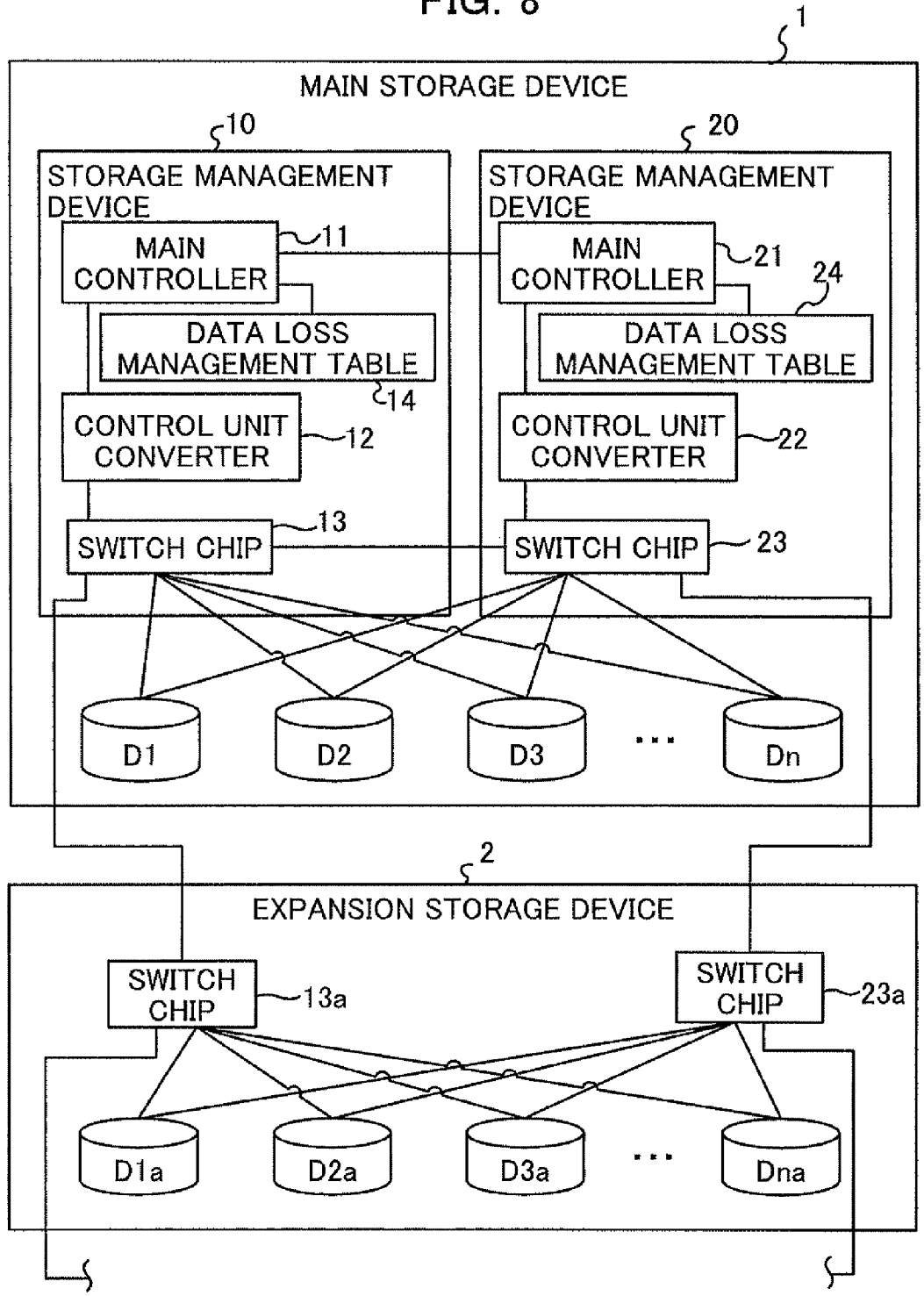
FIG. 8 illustrates a schematic view of the storage system.

FIG. 8 illustrates a schematic view of an example of the storage system according to the present invention. The storage system in FIG. 8 includes main storage device 1 and expansion storage device 2 connected to main storage device 1.

Main storage device 1 has storage management device 20 having the same structure of storage management device 10 previously described and disk drives D1 through Dn. Expansion storage device 2 expands disk drives managed by main storage device 1. Expansion storage device 2 has switch chips 13a and 23a, and disk drives D1a through Dna. Additionally, expansion storage device 2 may further connect to an expansion storage device not shown in FIG. 8.

The storage system has the storage management devices having redundant configurations and the expanded disk drives. Accordingly, higher reliability and a larger capacity are achieved.

According to the aspect of the present invention, data losses are recovered by registering the addresses of regions in which data are lost in error correction and simulating pseudo errors in the regions at the addresses registered where the disk management device manages disks in which data are managed in the different control unit.

Accordingly, the data losses are recovered by simulating the pseudo error occurrence in checking the disk drive or in accessing to the disk drive as well as in the event of actual errors. Therefore, a conventional device may be used effectively.

It is not desired to limit the inventive embodiments to the exact configurations and operations illustrated and described. In this embodiment, disk drive D1 is mirrored by disk drive D2. However, the present invention may be applicable to a disk configuration in RAID5 or RAID6.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk management method for managing a disk management device for writing and reading data to and from a disk drive, in which a recording medium is managed in a first control unit, the disk management method comprising:
   checking an error on said recording medium in said first control unit;
   correcting the error detected in said error checking operation after converting data including the error to a second control unit;
   registering a region in which data are lost due to an inconsistency between said first control unit and second control unit in a data loss region table; and
   recovering the loss of data with reference to the data loss region table.

2. The disk management method according to claim 1, further comprising:
   referring to said data loss region table in checking said recording medium cyclically for an error; and
   recovering the region when the data loss region of said recording medium is registered in the data loss region table.

3. The disk management method according to claim 1, further comprising:
   referring to said data loss region table when a read request to a specific disk is issued; and
   recovering the region when the data loss region of the disk is registered in said data loss region table.

4. The disk management method according to claim 1, wherein said disk drive has a redundant configuration, and a region in which an error occurs or data are lost is recovered using said redundant configuration during said error correcting or the lost data recovering.

5. The disk management method according to claim 1, wherein said data is block data.

6. A disk management method for managing a disk management device for writing and reading data to and from a disk drive, in which a recording medium is managed in a first control unit, the disk management method comprising:
   checking an error on said recording medium in said first control unit;
   correcting the error detected in said error checking operation after converting data including the error to a second control unit;
   registering a region in which data are lost due to an inconsistency between said first control unit and second control unit in a data loss region table;
   recovering the loss of data with reference to the data loss region table; and
   recovering the data loss region registered in said data loss region table by simulating an error occurrence in the region and deleting a registration of the region from said data loss region table.

7. The disk management method according to claim 6, further comprising:
   deleting the registration of the data loss region in said data loss region table when a write request to a specific disk is issued and the region corresponds to the write request.

8. The disk management method according to claim 6, wherein said recording medium is partitioned by said first control unit by 512 bytes as a block and said second control unit partitions said recording medium by 520 bytes as a block.

9. A disk management device for managing writing and reading data to and from a disk drive in a second control unit, in which a recording medium is managed in a first control unit, the disk management device comprising:
   an error checker for checking an error on said recording medium in said first control unit;
   an error corrector for correcting the error detected by said error checker after converting data including the error into said second control unit;
   a data loss region table for storing a region in which data are lost due to an inconsistency between the first control unit and the second control unit; and
   a data loss recovery unit for recovering a data loss with reference to said data loss region table.

10. A disk management device for managing writing and reading data to and from a disk drive in a second control unit, in which a recording medium is managed in a first control unit, the disk management device comprising:
    an error checker for checking an error on said recording medium in said first control unit;
    an error corrector for correcting the error detected by said error checker after converting data including the error into said second control unit;
    a data loss region table for storing a region in which data are lost due to an inconsistency between the first control unit and the second control unit; and
    a data loss recovery unit for recovering a data loss with reference to said data loss region table:
    wherein said data loss recovery unit reports that an error occurs in the region registered in said data loss region table to said error corrector to correct the error and then deletes a registration of the data loss region from said data loss region table.

11. The disk management device according to claim 9, wherein said data loss recovery unit refers to said data loss region table where a read request to a specific disk is issued.

12. The disk management device according to claim 9, wherein said disk drive has a redundant configuration and said error corrector or data loss recovery unit recover a region in which an error occurs or data are lost by using said redundant configuration.

13. The disk management device according to claim 9, wherein said data loss recovery unit refers to said data loss region table in checking said recording medium cyclically for an error.

14. The disk management device according to claim 10, wherein a registration of a data loss region registered in the data loss region table is deleted when a write request to a specific disk is issued and the region corresponds to the write request.

15. A storage system comprising a disk drive for managing a recording medium in a first control unit and a disk management device for managing writing and reading data to and from said disk drive in a second control unit, in which a recording medium is managed in a first control unit, the storage system comprising:
    an error checker for checking said recording medium for an error in said first control unit;
    an error corrector for correcting the error detected by said error checker after converting data including the error into said second control unit;
    a data loss region table for storing a region in which data are lost due to the inconsistency between said first control unit and the second control unit; and
    a data loss recovery unit for recovering a data loss with reference to said data loss region table.

16. The storage system according to claim 15, wherein said data loss recovery unit refers to said data loss region table in checking said recording medium cyclically for an error.

17. The storage system according to claim 15, wherein said data loss recovery unit refers to said data loss region table when a read request to a specific disk is issued.

18. The storage system according to claim 15, wherein said disk drive has a redundant configuration and said error corrector or data loss recovery unit recover a region in which an error occurs or data are lost by using said redundant configuration.

19. A storage system comprising a disk drive for managing a recording medium in a first control unit and a disk management device for managing writing and reading data to and from said disk drive in a second control unit, in which a recording medium is managed in a first control unit, the storage system comprising:
    an error checker for checking said recording medium for an error in said first control unit;
    an error corrector for correcting the error detected by said error checker after converting data including the error into said second control unit;
    a data loss region table for storing a region in which data are lost due to the inconsistency between said first control unit and the second control unit; and
    a data loss recovery unit for recovering a data loss with reference to said data loss region table;
    wherein said data loss recovery unit reports that an error occurs in a region registered in said data loss region table to said error corrector to recover the error and then deletes a registration of the data loss region from said data loss region table.

20. The storage system according to claim 19, wherein a registration of a region registered in said data loss region table is deleted when a write request to a specific disk is issued and the region corresponds to the write request.

* * * * *

UNITED STATES PATENT AND TRADEMARK OFFICE
CERTIFICATE OF CORRECTION

| | | |
|---|---|---|
| PATENT NO. | : 7,925,919 B2 | Page 1 of 1 |
| APPLICATION NO. | : 12/234940 | |
| DATED | : April 12, 2011 | |
| INVENTOR(S) | : Norihide Kubota et al. | |

It is certified that error appears in the above-identified patent and that said Letters Patent is hereby corrected as shown below:

Column 7, Line 34 (Approx.), In Claim 10, delete "table:" and insert --table;--, therefor.

Signed and Sealed this
Twentieth Day of September, 2011

David J. Kappos
*Director of the United States Patent and Trademark Office*